US006782412B2

(12) United States Patent
Brophy et al.

(10) Patent No.: US 6,782,412 B2
(45) Date of Patent: Aug. 24, 2004

(54) SYSTEMS AND METHODS FOR PROVIDING UNIFIED MULTIMEDIA COMMUNICATION SERVICES

(75) Inventors: Kevin Brophy, Brockton, MA (US); Anita Chow, Nashua, NH (US); Mark Hahn, Stow, MA (US); Luis Lejter, Revere, MA (US); David Robbins, Grafton, MA (US); John Schettino, Camas, WA (US)

(73) Assignee: Verizon Laboratories Inc., Waltham, MA (US)

( * ) Notice: Subject to any disclaimer, the term of this patent is extended or adjusted under 35 U.S.C. 154(b) by 7 days.

(21) Appl. No.: 09/382,006

(22) Filed: Aug. 24, 1999

(65) Prior Publication Data

US 2003/0055974 A1 Mar. 20, 2003

(51) Int. Cl.[7] .......................... G06F 15/173; H04Q 7/20; H04L 12/16
(52) U.S. Cl. ...................... 709/204; 709/207; 719/318; 379/88.13; 379/202.01
(58) Field of Search .................................. 709/227, 223, 709/229, 204, 205, 206, 207; 379/88.22, 88.23, 88.25, 88.13, 88.14, 88.16, 88.17, 88.18; 707/103

(56) References Cited

U.S. PATENT DOCUMENTS

| | | | |
|---|---|---|---|
| 4,837,798 A | | 6/1989 | Cohen et al. ................. 379/88 |
| 5,608,786 A | | 3/1997 | Gordon ....................... 379/100 |
| 5,647,002 A | | 7/1997 | Brunson ....................... 380/49 |
| 5,742,668 A | | 4/1998 | Pepe et al. ..................... 379/58 |
| 5,742,905 A | | 4/1998 | Pepe et al. ................... 455/461 |
| 5,859,898 A | * | 1/1999 | Checco .................... 379/88.01 |
| 5,867,495 A | * | 2/1999 | Elliott et al. ................ 370/352 |
| 6,157,924 A | * | 12/2000 | Austin .......................... 707/10 |
| 6,178,331 B1 | * | 1/2001 | Holmes et al. ............. 455/466 |

OTHER PUBLICATIONS

Rangan et al. "Software Architecture for Integration of Video Services in the Etherphone System.", IEEE Journal on Selected Area of Communications, v.9, n.9, Dec. 1991.*

* cited by examiner

Primary Examiner—Dung C. Dinh
(74) Attorney, Agent, or Firm—Leonard C. Suchyta, Esq.; Joel Wall, Esq.

(57) ABSTRACT

The systems and methods described herein include a platform that employs a client/server architecture to provide an extensible set of real time and messaging communication services to a plurality of users. The platform allows the clients to configure and activate the services as each user wishes, thereby providing individual control over the communication services a user receives. The platform includes a server that allows a user to select how the user will participate in a communications event. This can include control over the end points and media over which the communications event occurs. The systems described herein additionally provide a framework for developing integrated voice and data services that can be deployed on the platform for extending the services available to the plurality of clients.

34 Claims, 13 Drawing Sheets

US 6,782,412 B2

SYSTEMS AND METHODS FOR PROVIDING UNIFIED MULTIMEDIA COMMUNICATION SERVICES

FIELD OF THE INVENTION

This application generally relates to communication systems, and more specifically to communication systems that include systems that allow a user to control how they participate in a communications event, including how they receive and send multimedia content.

BACKGROUND OF THE INVENTION

Today there is an ever increasing demand for providing communication services that integrate both voice services, such as telephone calls, voice mail, and interactive voice response, with data services such as e-mail and personal information management. This desire for integrated voice and data services has driven the development of new telecommunication platforms that can handle voice and data being carried on both circuit switched and packet switched networks. These platforms can operate on digitized voice as well as conventional computer data to provide integrated services that allow customers to perform more sophisticated telecommunication techniques. For example, such systems can perform adaptive call forwarding, wherein a computer program responding to information carried on the packet switched network can adaptively forward a telephone call to predetermined customer premises equipment (CPE) according to a predetermined schedule that has been programmed into the platform. Such integrated voice and data services provide more powerful functions for allowing customers to communicate with each other.

Such integrated systems also facilitate communications events that are more complex than traditional voice calls and voice mail. For example, communications events today can employ multimedia data formats, involve the coordinated delivery of text, audio and video, and even extend across multiple different CPEs, such as handsets, workstations and personal digital assistants. Thus, although these new types of communications events provide powerful ways to exchange information, they are too complex to be serviced efficiently by traditional platforms and models for handling calls.

In particular, existing systems for allowing integrated voice and data services, and multimedia communications typically require each user to interact with the communications event in a predefined, or narrowly defined way, providing limited ability for the user to control how a call, or communications event will be received and handled, and providing little opportunity for extending the services that can be provided to a user. Additionally, existing systems, although capable of handling voice and data events, often provide limited coordination of real time and messaging communications events. Thus, existing systems tie users to particular devices and services, and fail to provide a user with a facile way to manage the services and equipment that are available to the user for handling a communications event.

Accordingly, there is a need to provide communications systems that provide a user with greater control over a communications event and that are more readily extended and scaled.

There is a further need for systems that provide a user with increased control over the systems and devices that can be employed during a communications event, including providing systems that give control over the media formats of a communications event.

There is still a further need to provide systems that more seamlessly integrate real-time communications events with messaging events.

SUMMARY OF THE INVENTION

The systems and methods described herein include a platform that employs a client/server architecture to provide an extensible set of real time and messaging communication services to a plurality of users. To this end, the platform architecture provides a customer centric model for processing a communications event, thus allowing a customer to control how the customer participates in a communications event. The platform allows the customer to configure and activate the services, thereby providing individual control over the communication services a customer receives. The platform includes a media server that interfaces to a circuit-switched network, such as the PSTN, as well as to a packet switched network, such as the Internet, to provide audio, video, and data communication services. The platform further includes an application server that acts as a client to the media server, and that coordinates a plurality of session processes, each of which can be associated with a particular customer. It will be seen that the systems described herein also provide a framework for developing communication services that can be deployed on the platform for extending the services available to a customer.

More particularly, the systems include an extensible client/server system for enabling the development of audio, video and data communication services. These systems comprise a media server for controlling hardware devices that interface communication networks, such as the public switched telephone network. The media server provides a plurality of resource objects each having a method and a data structure for controlling a hardware device to perform a communication function, and an object oriented client interface for organizing the objects into a set of application-level components for performing a communication operation. The system can further include an application server having an application framework that incorporates the resource objects to provide an extensible mechanism for interacting with communication operations being implemented on the hardware device.

More particularly, the system provides in one aspect methods for allowing a customer to control their participation in a communications event. These methods can comprise the steps of identifying a communications event that is associated with the customer, providing for that customer a session object capable of maintaining state information that is representative of the state of the customer's communications events as well as being representative of control information provided by that specific customer; and providing a plurality of service objects, each being capable of providing a communications service for supporting the communications event, and each being responsive to the state information maintained within the session object. Accordingly, the session object operates as a control point for accessing the service objects and thereby for allowing the customer to configure selectively the support for the communications event the customer wishes. Moreover, as the session object maintains state information that the customer can alter, the customer is therefore provided with the opportunity to change state information during a communications event, thereby allowing the customer to change, even dynamically, how they participate in the communications event. For example, if the session object maintains state information that indicates that the customer wishes to receive telephone calls over a traditional handset, by changing the state information to change the end points employed (i.e., also known as resetting the control leg), the customer can now request that an ongoing telephone call be switched to a multimedia workstation, without interrupting the call. In a further practice, the state information can be employed by the system for modifying the behavior of two or more service objects to provide coordinated operation of the service objects. In this way, the state information can be employed to allow service objects to cooperate in providing services to the customer.

In a further practice, the methods of the invention include the steps of providing a customer profile object that has information which is representative of certain characteristics associated with a respective customer. These characteristics can include information that is representative of customer preferences which may be used to modify the behavior of the service objects. Customer preferences include, for example, the number of times the customer wishes a phone to ring before a call is transferred to voice mail, as well as other similar customer preferences.

The methods described herein also include providing a communications infrastructure for mapping calls associated with a customer to a communications structure that is capable of processing communication information associated with the calls. In this practice, a media server may be provided that has a plurality of resource objects, each of which is capable of allowing the service object to control a communication device that is capable of supporting the call. Communication devices include telephone handsets, multimedia PC's, PBX systems, or any hardware or software communication device. The communications infrastructure can include a control leg object that is capable of mapping a call to a set of resource objects that may control a communication device, such as a telephone, to provide therefore a media pathway for coupling the customer to the call. The media pathway can be an audio pathway, a video pathway, a data pathway, a multimedia pathway or any pathway suitable for supporting the application at hand.

In one embodiment, the invention will be understood to provide methods that allow the system to access a set of resource objects that map the call to a plurality of different communication devices for providing a virtual multimedia communication terminal. Accordingly, the systems and methods described herein are hardware and software communication device independent, allowing a customer to leverage their already existing communication devices to provide high-level communication functionality.

In a further optional practice, the state information may be employed to identify a set of resource objects that map the call to a communication device selected by the customer. In a further alternative practice, the methods described herein provide a communications infrastructure that includes a call management object for mapping a call to a set of resource objects capable of offering the call as a member of a set of calls available to the customer. The communication infrastructure can further provide an incoming call agent that is capable of processing the state information of a session object to determine whether to attach a call to a call management object, to transfer the call to a predetermined location or device, to query the customer on how to handle the call or to block the call. Additionally, the communication infrastructure can also include a call recorder agent, capable of processing one or more media streams associated with the call and packaging the media stream or streams into an e-mail message for delivery to a mailbox associated with a customer. Additionally, the communication infrastructure can include a media translation agent capable of supporting cross-media translation, including real-time cross media translation, to translate a media stream associated with a call from a first format to a second format.

In a further practice, the methods described herein allow a customer to create a connection object that is capable of allowing the customer to interact with the session object. The connection object provides a channel object that is capable of acting as a media pathway between a communication device employed by the customer and the service object. In this way, the customer can interact through the channel object with the service object, which can be an interactive voice service.

In a further aspect, the invention will be understood as systems for allowing a customer to control their participation in a communications event. These systems comprise a media server that has a plurality of resource objects, each being capable of providing control over a communication device, and an application server for supporting a communication application, having a service object capable of interfacing with the resource objects and connecting the resource objects into a structure for supporting the communications event. Accordingly, it will be understood that the systems described herein are extensible in that new services are readily added into the system and connected together to provide new communication services for the customers.

BRIEF DESCRIPTION OF THE DRAWINGS

The above-mentioned features of the invention will be apparent by reference to the following description taken in connection with the accompanying drawings in which.

DETAILED DESCRIPTION OF THE ILLUSTRATED EMBODIMENT

The integration of computer and telephony services requires a platform that is capable of handling communications events that can occur in various media formats and over various communication channels. As communication technology continues to evolve, flexible and extendible platforms will be necessary for supporting the more complex communications events in which customers will soon be able to participate. However, conventional service platforms, even those intended to integrate computer technologies and communication capabilities, are typically built around a communication model wherein a call is an event in which a person must participate. This call centered view of communications vests the call with control over the communications event and generally dictates to the customer how the customer should participate in the call. As will be seen from the following, the systems and methods described herein employ an alternative model, allowing a person wants to be able to control a communications event or many different communications events to be able to extend the type of control the customer has over the communications event. To this end, the systems and methods described herein take a customer centered approach for providing a communications platform. Thus, the communication platforms of the invention allow the customers access to services as they choose using a variety of customer premises equipment (CPE), including wireline/wireless phones, personal computers and personal digital assistants (PDAs).

Figure 1:
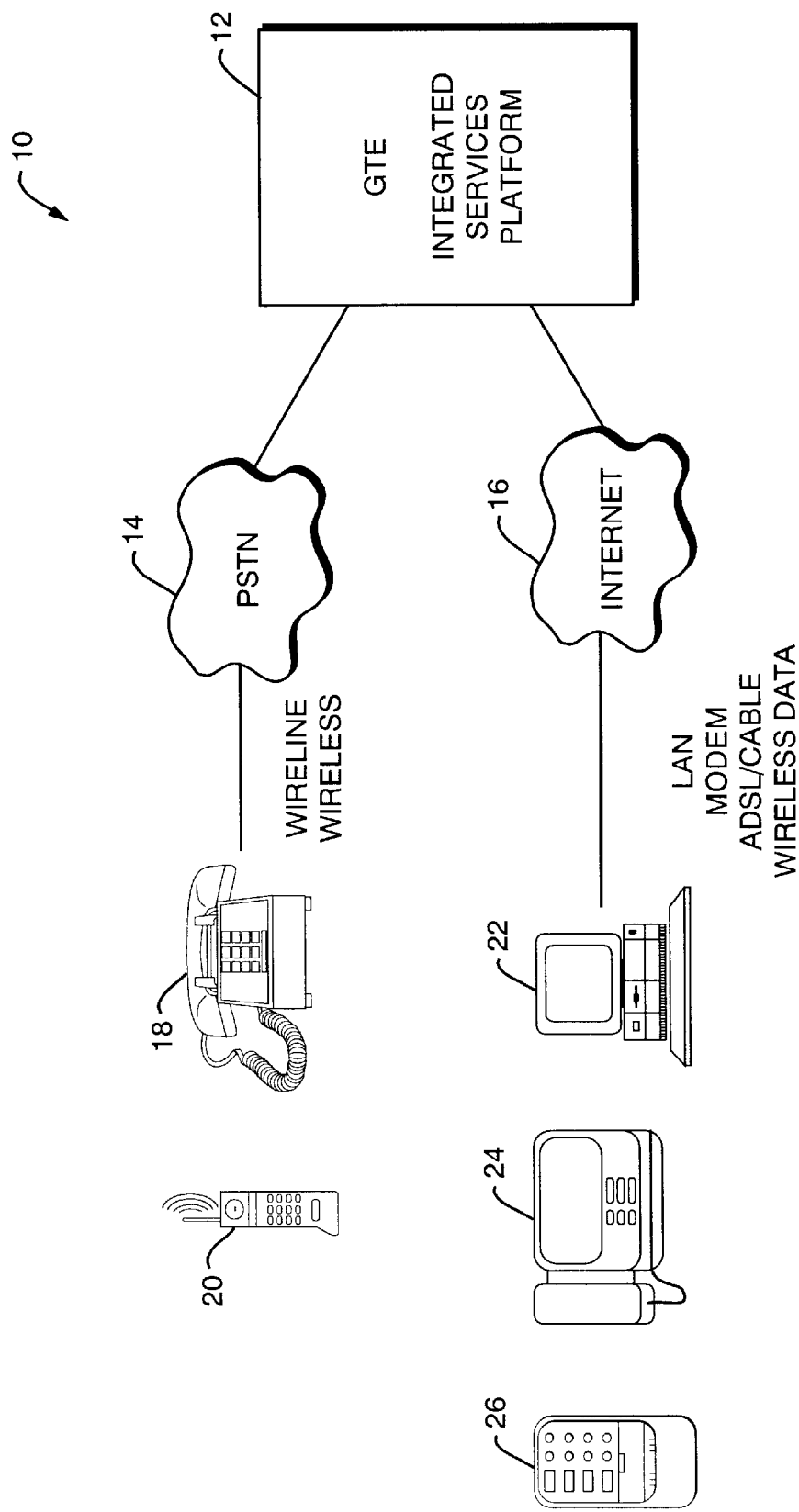
FIG. 1 depicts one system 10 according to the invention.

The flexibility of the architecture of the systems and methods described herein is depicted pictorially in FIG. 1. Specifically, FIG. 1 shows a system 10 that includes an integrated service platform (ISP) 12 that couples to a circuit switched network 14, such as the public switching telephone network (PSTN), which couples to communication devices, such as depicted CPE 18 and 20. Similarly, FIG. 1 depicts that a packet switched network 16, such as the Internet, can couple to the ISP 12 thereby providing a connection for the data communication devices, such as the illustrated workstation 22, video phone 24, and PDA device 26. The data communication devices 22, 24 and 26 can couple to the Internet through any suitable communication pathway, such as a local area network (LAN), modem connection, digital subscriber loop (DSL), cable connection, or wireless connection. It can be seen from a review of FIG. 1, that the ISP 12 sits between the circuit switched network 14 and the packet switched network 16. The ISP 12 thus allows a customer to have integrated control over various communications events that are to be serviced by the platform 12. A communications event can be any type of event or occurrence that involves the delivery of information between parties, or between the same party. Communications events can be considered either real-time events or messaging events. Real-time communications events can include calls over the PSTN, IP network, or a combination of both, and can include multiple party conference calls, which are audio, video, data or multimedia. Examples of messaging events can include email, file transfers, documents delivered by push systems, or any other suitable event. Messaging events can carry information in any format, including text, audio, video, alone and in combination.

The integrated control provided by the systems and methods of the invention enhances the way customers communicate with other individuals/groups. It will be understood herein that a customer can be any person, business or entity that can be identified as a party having an interest in a communications event. For example, under certain circumstances a conference room can be deemed to be a customer, as the individuals in the conference room may wish that conference room exert some control over how a conference call event is handled. For example, the conference room can determine whether any incoming calls that arrive to the conference room are to be joined to the conference call event. As will be seen from the following, the ISP 12 can provide a set of services that seamlessly integrate personal mobility, multimedia call management, and unified messaging. As a result, such ISPs provide an extendible, robust platform for next-generation communications network/services.

Figure 2:
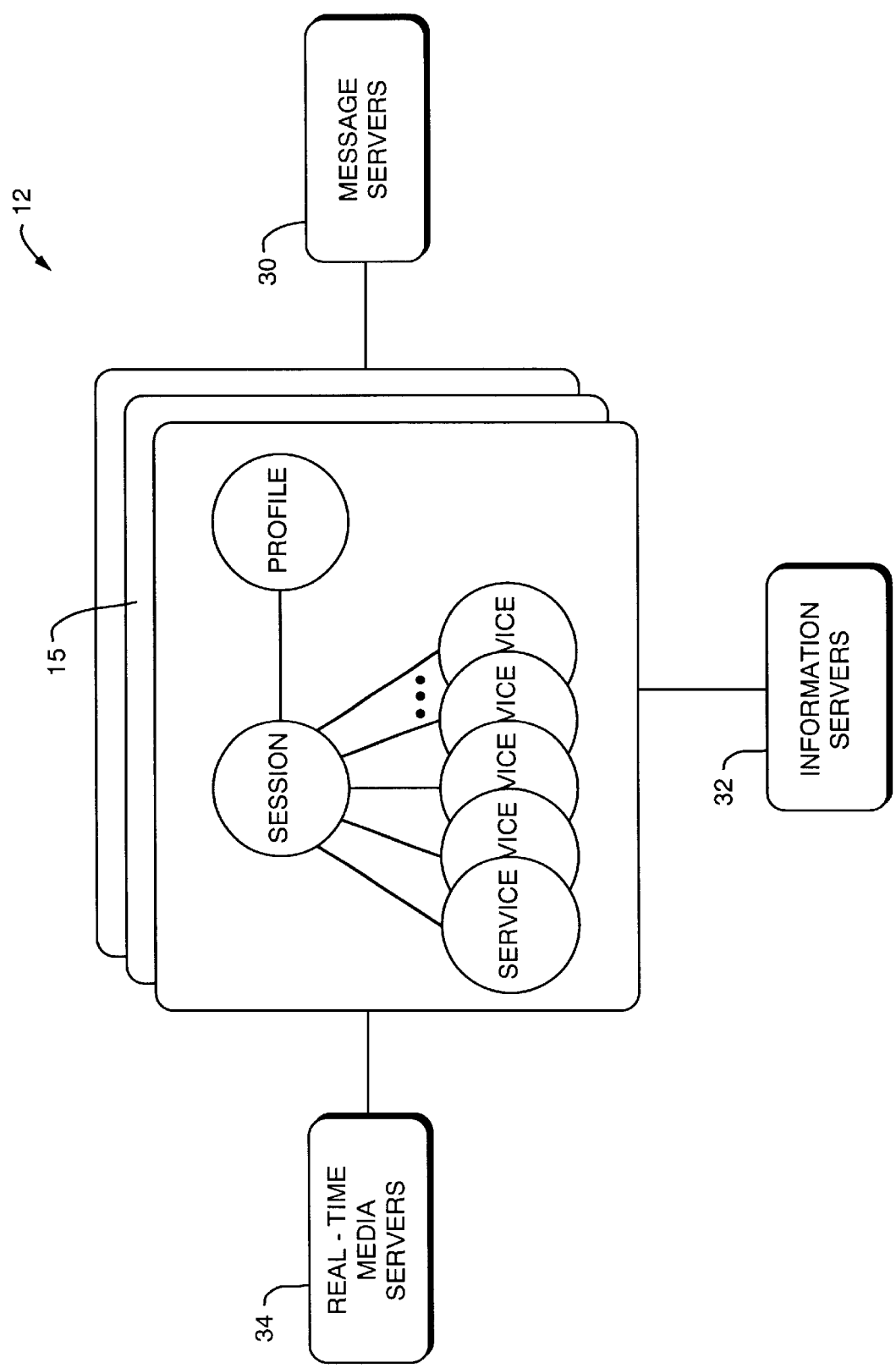
FIG. 2 depicts in greater detail a service platform such as that depicted in FIG. 1.

A high-level overview of the architecture of one embodiment of an ISP according to the invention is shown in FIG. 2. More particularly, FIG. 2 shows that the ISP 12 can include an application server 15, media servers 34, message servers 30, and information servers 32. The media servers 34 and the message servers 30 act as communication building blocks that can be employed by services executing on the application server 15 to create communication pathways for carrying data between end points. The information server 32 can act as an information building block that can provide to services running on the application server 15 information that may be required by a service to control or perform a communications event as requested or directed by a customer.

The application server 15 is at the center of the ISP Architecture, acting as the "brain" of the system by coordinating how the other components work together to form integrated communications/information services. In one embodiment, the application server 15 consists of an object-oriented framework designed to simplify the creation of services that integrate the capabilities and resources of the surrounding building blocks to perform tasks on behalf of a customer. Each service executes within the context of a session, which supports the sharing of data between the services and helps coordinate their activities. A profile object provides the preferences and personal information used to customize the behavior of the session and services for a particular customer.

Although the application server 15 can comprise an object oriented framework, it will be understood by those of ordinary skill in the art that structures alternative to object oriented frameworks can be employed for implementing the application server. However, for purposes of illustrating the systems of the invention, the application server 15 will be described with reference to an application server that employs an object oriented framework. As is known to those of skill in the art, object oriented frameworks are generally understood as a set of classes that embody an abstract design for solutions to a family of related problems. See *The C++ Programming Language*, 2nd Ed., Stroustrup Addision-Wesley. Accordingly, a framework provides a prefabricated structure, or template, of a working program. For example, for a traditional application program, a framework can provide support and "default" behavior for drawing windows, scroll bars and menus. Optionally, a framework can provide sufficient functionality and wired-in interconnections between object classes to provide an infrastructure for a developer developing services for the ISP 12. The interconnections are generally understood to provide the architectural model and design for developers, allowing developers to focus on the problem domain and allowing increased levels of hardware independence, as frameworks can provide to developers abstractions of common communication devices reducing the need to include within a service application hardware dependent code.

The design and development of object oriented frameworks, such as the framework that comprises the application server 15 described herein follows from principles known in the art of computer science, such as principles set forth in Booch, Grady, *"Designing an Application Framework"*, Dr. Dobb's Journal 19, No. 2, (February, 1994); Booch, Grady, *"Object Oriented Analysis and Design With Applications"*, Redwood City, Calif. Benjamin/Cummings (1994); and Taligent, *"Building Object Oriented Frameworks"*, Taligent, Inc., (1994). It will further be understood by those of ordinary skill in the art that although FIG. 2 depicts the application server 15 in functional block form, the depicted elements can be realized as software processes executing on a data processing platform, such as a SUN workstation, manufactured and sold by SUN, Inc. of Mountain View, Calif., running the Unix operating system. Additionally, the functional blocks depicted herein can also be realized as hardware devices, as well as devices that include both hardware and software for operating as described.

It will further be understood that the systems of the invention can be standalone computing devices that can interconnect and communicate with external communication devices such as PBX systems, routers, and other communication devices. Alternatively, the systems of the invention can be incorporated into communication devices such as PBX systems, multimedia data processing platforms, or any other suitable communication device. Accordingly, it will be understood that the systems and methods described herein can be modified, extended, or integrated into prior art communication devices by those of ordinary skill in the art without departing from the scope of the invention.

Figure 3:
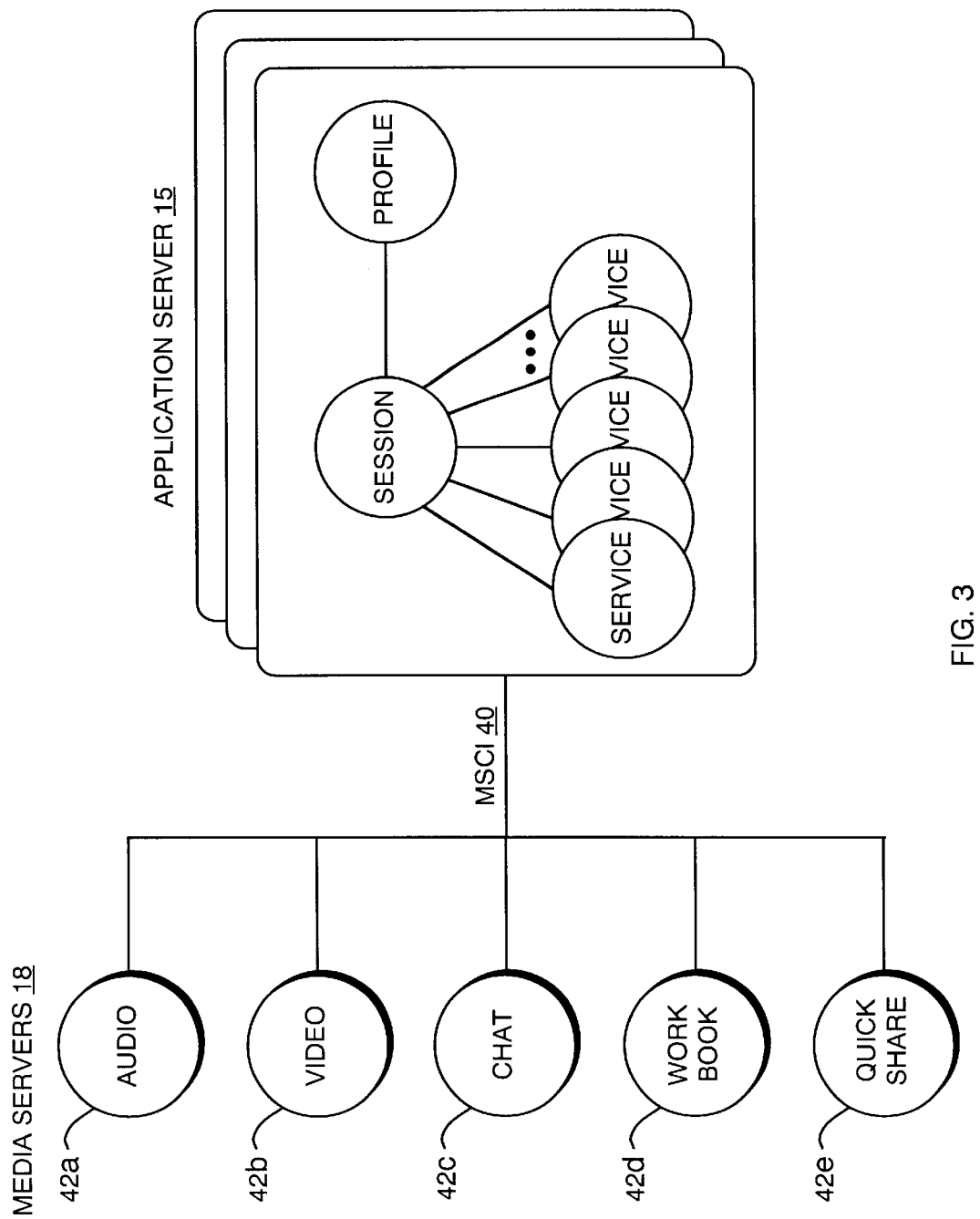
FIG. 3 depicts in more detail the media servers that can couple to the platform of FIG. 2.

The depicted ISP 12, as shown is FIG. 3, supports real-time multimedia communications, such as calls consisting of one or more media type. For example, the ISP 12 can define media types to support calls consisting of audio data, video data, text-based chat, white boards and shared applications. Other media types can also be defined. Each media type can be supported by a corresponding media server 42A–E. Each media server 42A–E can act to establish a communications pathway between one or more end-points in a manner that is appropriate for that media. For example, to complete an audio pathway between a standard phone and an IP Telephony client on a PC, the audio server 42A can be responsible for allocating a port on an IP-PSTN gateway and establishing the necessary connections from the gateway to the different network end-points.

In one embodiment, the application server 15 can employ a Media Server Client Interface 40 (MSCI) to communicate with the media servers 42A–E. The MSCI 40 can be an object-oriented programming interface that allows client applications, such as the application server 15, to interact with the media servers 42A–E using an abstract connection model to specify and establish a media pathway. Each media server 42A–E can be capable of implementing the objects defined by the MSCI 40 and for mapping the set of logical connections between the objects into a set of physical connections between corresponding media end-points. Accordingly, a service can request the appropriate media server to provide certain functionality, such as connecting the customer to an incoming phone call, and the media server will map the requested service onto the physical devices necessary for achieving that function. Thus, the media servers 42A–E are understood to include the hardware specific control software capable of controlling the hardware devices associated with that particular media server for causing the hardware devices to act in a manner that provides the service requested by the customer. The development of such hardware specific control software follows from principles well known in the art of computer science and embedded system development.

In one embodiment, to provide control over the resources of the media servers 42A–E, the MSCI 40 can define two object types: registration and resource object types. A registration object allows an application to specify interest in an asynchronous event, such as an incoming call or hang-up event. A resource object is a logical element, corresponding to one or more physical units, designed to perform a specific function, such as manage a call end-point, or record a media stream. A service can connect the resource objects together in order to create a media pathway and perform various operations.

Figure 4:
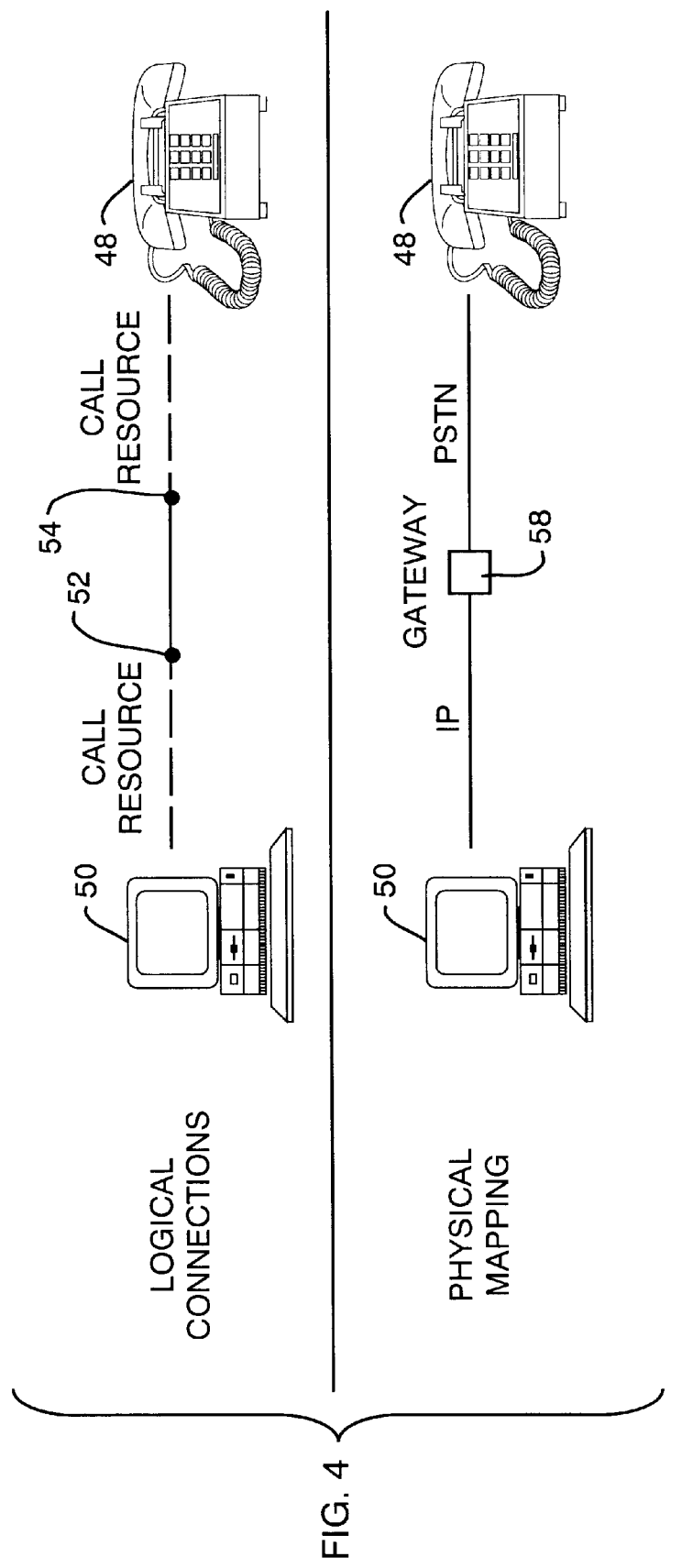
FIG. 4 depicts graphically the connecting of resource objects for forming a communication pathway.

To this end, the resource objects can include a call resource that represents an incoming or outgoing call. In general, a call resource object corresponds to the media server's media channel to a media-specific client, such as a PSTN phone, or an IP audio/video application. FIG. 4, illustrates a mapping produced by the audio server 42A when two call resources are connected together. Specifically, FIG. 4 depicts pictorially the logical connections and the physical mapping associated with the logical connections. FIG. 4 depicts two end points to a communications event, shown in FIG. 4 as a handset 48 and a workstation 50. Two call resource objects 52 and 54 connect between the end points 48 and 50 for providing a communication pathway therebetween. The call resource objects 52 and 54 are abstractions exported by the media servers, in this case the audio server 42A, that can be connected by a service to provide a communication pathway between the handset 48 and the depicted workstation 50. As also shown by FIG. 4, a physical mapping can occur between the handset 48 and the workstation 50 wherein the interconnected call resource objects 52 and 54 are realized as a gateway 58 that couples between a packet switched network, such as the depicted IP network from the workstation 50 and the circuit switched network such as the PSTN that would couple to the handset 48. The gateway 58 can be an audio bridge of the type commonly employed for mediating between Internet telephony and circuit switched telephony events. Such gateways are available commercially, sold for example by Lucent Technologies of Murray Hill, N.J., however, any suitable gateway can be employed. Note that from a service developer's perspective, the call resources are abstract objects and are, therefore, network-independent. This relieves the service developer from having to provide this functionality, and makes the service platform independent.

Figure 5:
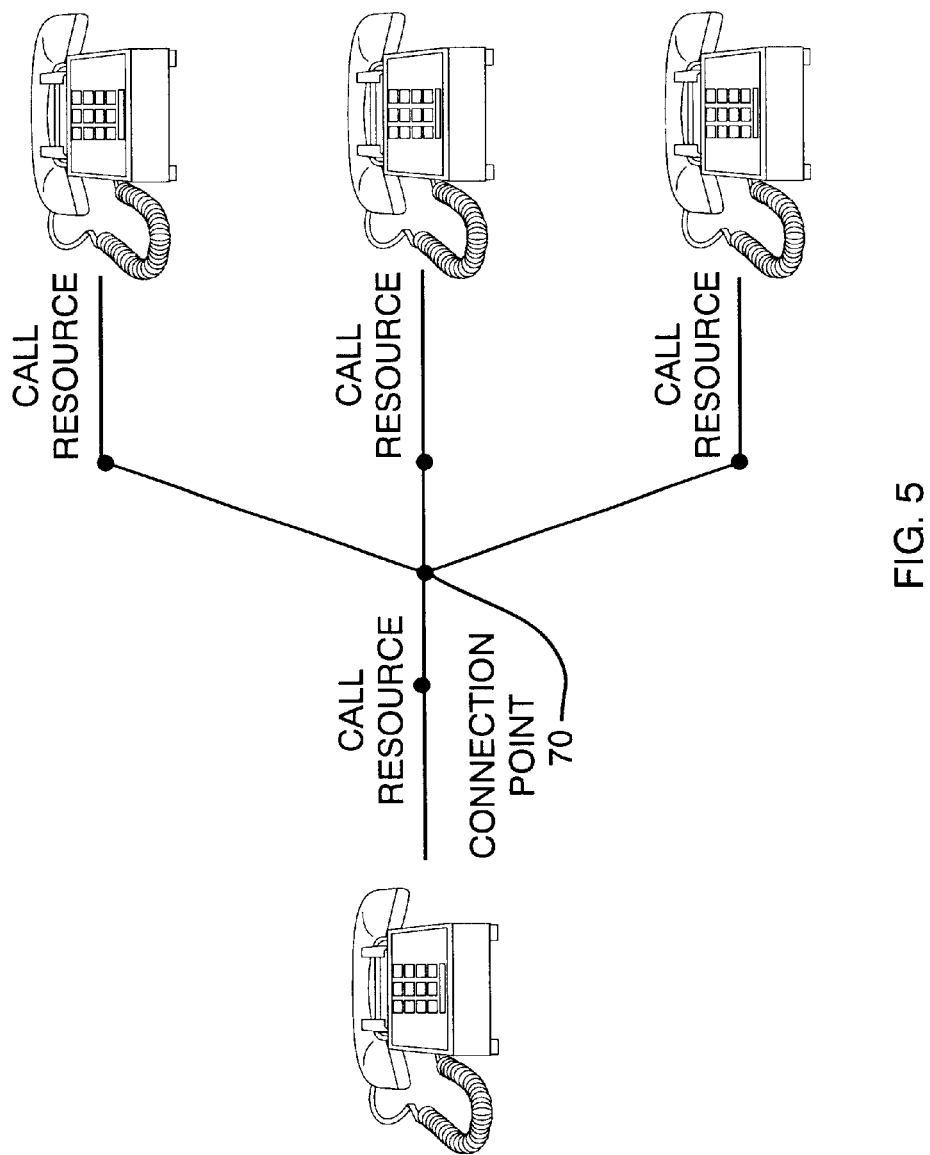
FIG. 5 depicts graphically the connecting of resource objects for forming a communication pathway between a plurality of calls.

FIGS. 5 through 8 illustrate generally other examples of resource objects that can be provided by the media servers 42A–42D for allowing a service object to connect different communication devices into a desired media pathway. For example, a connection point 70 can be provided to connect a group of resources together. FIG. 5, depicts how a connection point 70 can be used to create a multi-party-conference call. Each media server decides how to implement the resulting conference. For example, the audio server 42A may choose to use switch-based conferencing hardware, depending on the nature of the calls, while the Video server 42B may use IP multicast exclusively.

Figure 6:
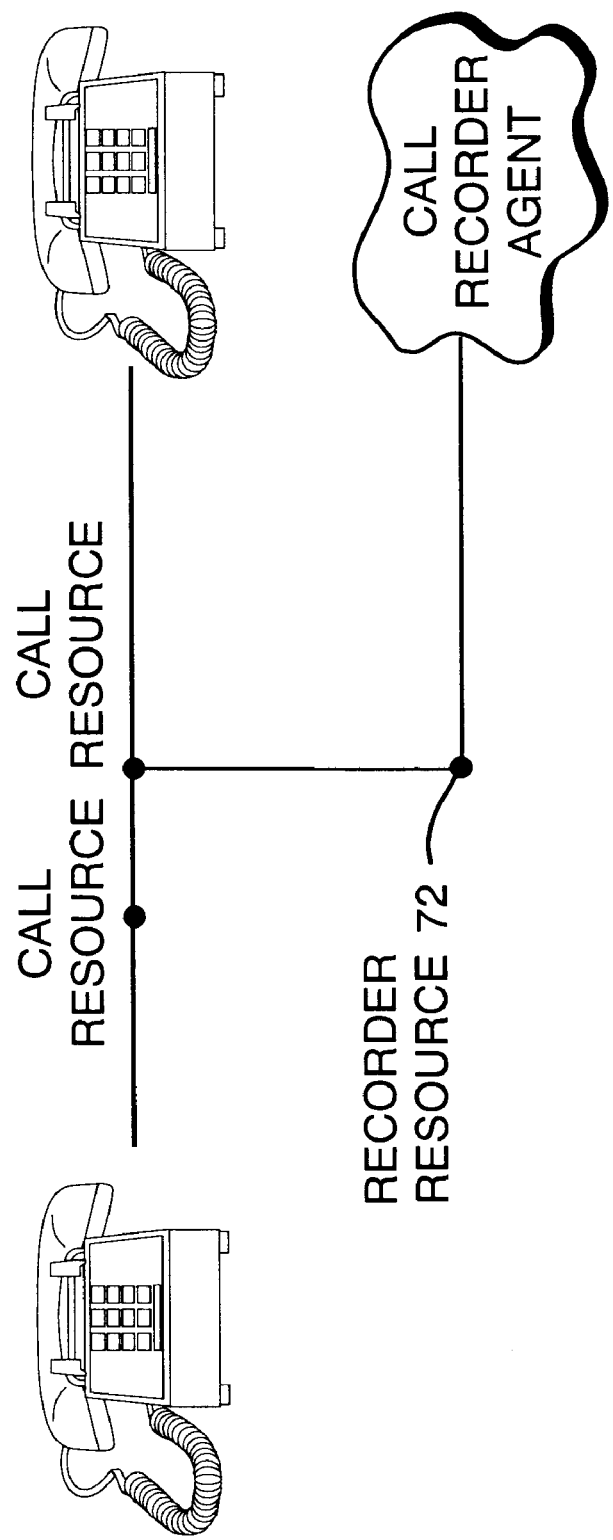
FIG. 6 depicts graphically the connecting of resource objects to form a communication pathway that includes a path to a call recorder agent.

A recorder resource 72 can be used to record the media stream within a call/conference. It can also be used to playback a recorded media file. In FIG. 6, a service, called the call recorder agent, described later, is implemented using such a recorder resource 72.

Figure 7:
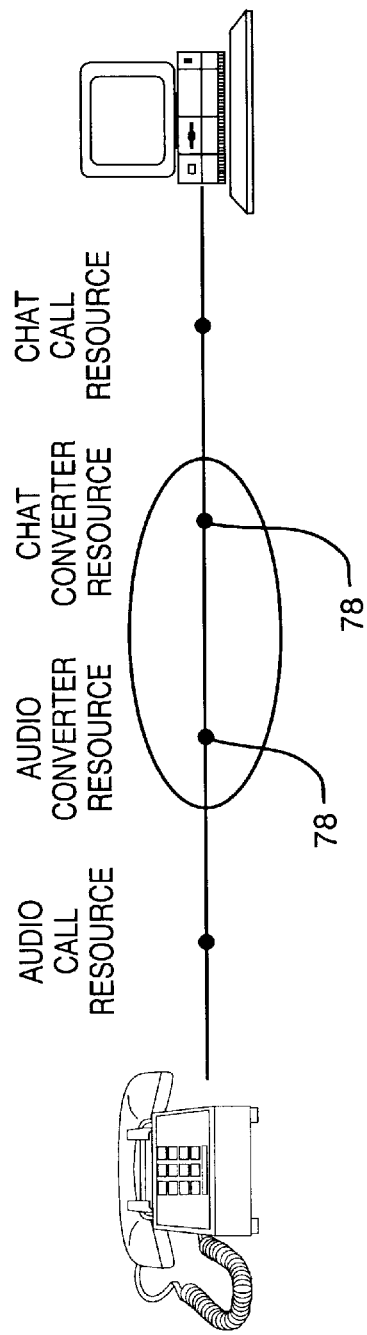
FIG. 7 depicts graphically the connecting of resource objects to form a communication pathway between a voice device and a data device.

In addition, the MSCI 40 can define an optional converter resource, which can be employed to transform a media stream into another form/media. For example, the audio server 42A provides a resource which supports speech-to-text/text-to-speech conversion. In FIG. 7, a converter resource 78 is depicted from both the audio server 42A and the chat server 42C to perform real-time, cross-media translation.

Figure 8:
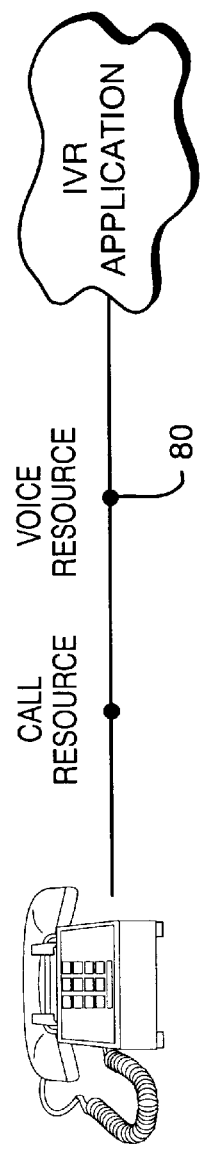
FIG. 8 depicts graphically the connecting of resource objects to provide a communication pathway to an interactive voice response service.

Additionally, each media server may provide additional, media-specific functions to application developers. For example, the audio server 42A can define a voice resource 80 to provide a set of functions, such as play prompts and collect DTMF digits, to support development of interactive voice response (IVR) services, as shown in FIG. 8.

Figure 9:
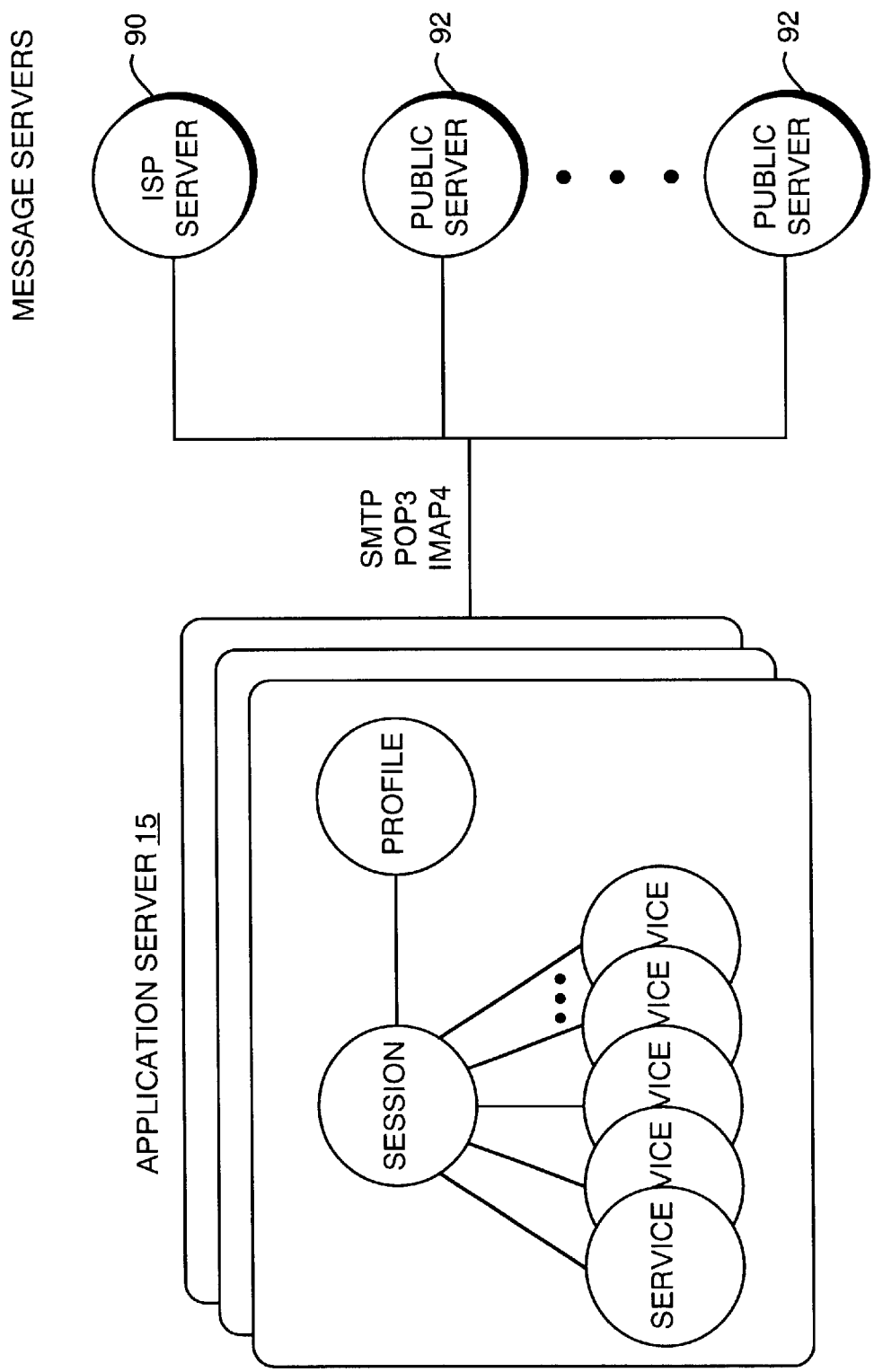
FIG. 9 depicts graphically an application server coupled to a plurality of message servers.

The ISP 15 can support different types of advanced communications services, including real-time multimedia communications. The systems described herein provide the ability to support services that integrate and extend asynchronous communications, or messaging. To integrate these real-time communications with messaging, the ISP can employ a standard e-mail server (depicted as "ISP Server 90" in FIG. 9) to store messages. For example, voice mail can be stored as an e-mail message containing a Multipurpose Internet Mail Extension (MIME) encoded audio attachment, and later the messages can be retrieved using a standard e-mail client.

Optionally, a Message Interface Application Programming Interface (API) can be provided to allow service developers to compose/send messages using a mail protocol, like the Simple Mail Transfer Protocol (SMTP) and to retrieve messages from the message servers using a client/server messaging protocol such as Post Office Protocol (POP3) or Internet Message Access Protocol (IMAP4). Since the Message Interface can be standards-based, it will be understood that ISP customers can use a publicly accessible e-mail server, such as the depicted public server 92 of FIG. 9. However, using the ISP message server offers additional benefits. In one embodiment, an ISP message preprocessor, an agent working in cooperation with the message server, can examine each incoming message and modify the message on behalf of the customer. For example, based on a customer's preferences, such a message preprocessor may replace a large audio file attachment with HTML streaming controls to reduce the time it takes to download the message.

Figure 10:
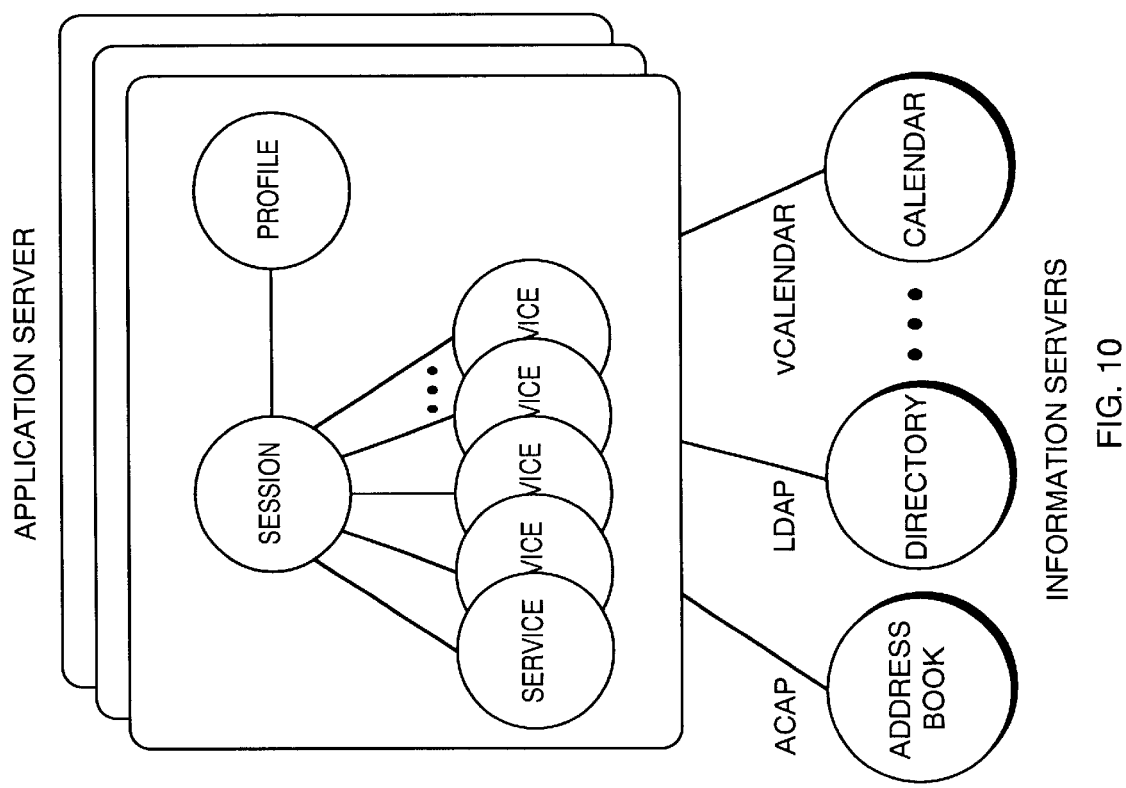
FIG. 10 depicts graphically an application server coupled to information servers.

With reference again to FIG. 2, the ISP 15 can also support an extensible set of Information servers 32 on which customers can store various types of personal information, such as address books and calendars. Along with the profile and mailbox, this information helps the ISP 15 to establish a network-based "presence" for each customer, allowing a service developer to create more personalized services. In one embodiment depicted in FIG. 10, an Application Configuration Access Protocol (ACAP) server can support address books, while a Lightweight Directory Access Protocol (LDAP) server can support larger directories. Other optional servers can include a certificate server to support digital signatures. For each such Information server 32, an API can be defined and used by service developers on the application server. The APIs are defined to reduce or eliminate dependency on a particular standard within a service. For example, the Address Book Interface may define abstractions that can be implemented using either ACAP or LDAP.

As seen from the above description, the ISP application server 15 supports a class of integrated communication/information services that customers can access whenever, and wherever they choose. A service executing on behalf of a specific customer operates within the context of a customer session, called an ISP application. Each ISP application can be composed of a set of inter-connected objects derived from an ISP application model. As discussed above, the ISP application model can be an object-oriented framework that supports the development of configurable, customizable services that include built-in support for certain service design goals, including CPE- and Network-Independence.

Figure 12:
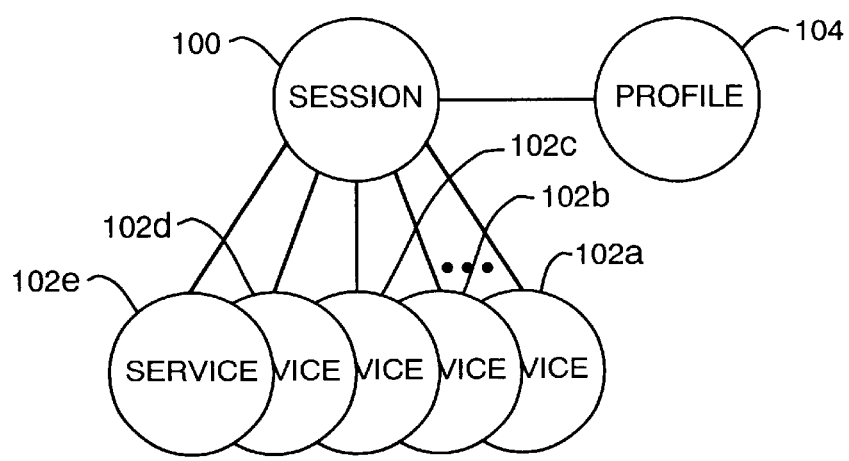
FIG. 12 depicts in more detail the objects that comprise an application suitable for running on the platform of FIG. 2.

FIG. 12 depicts more specifically the components that make up an application for providing communication services to a customer. Specifically, FIG. 12 depicts a model for an application model that includes a session object 100, a plurality of service objects 102A–102E and a profile object 104. These objects cooperate to implement a service.

The session object 100 represents a "context" within which all work in the form of a Service takes place on behalf of a specific customer. To this end, the session object 100 can store information representative of the state of the communications events associated with a particular customer. A session object 100 is associated with exactly one customer and is responsible for managing that customer's executing services. The application server can allow only one session object 100 per customer to exist at any given time. However, there may be more than one service executing simultaneously within that session object 100. Because of this, the session object 100 can also be responsible for managing any shared objects needed to coordinate the activities of related services, such as the Communications Infrastructure described below that stores the "call state" information used by the integrated set of communications services defined within the ISP. The state information maintained by the session object 100 can include any information that a service may be interested in knowing. For example, the state information can include information that describes each structure that is presently supporting a communications event in which the customer is participating. This can include information regarding the call management infrastructure, including the control leg information, which is described in detail hereinafter. State information can also include a list of the services that are currently running, the endpoint devices available to a customer, a bulletin board space that can carry information of interest to any party, and to which different parties can post information for other services and parties to see and consider, and a cache memory that allows a session object to cache information that a service may want to access subsequently. Additionally, the state information can include customer preferences as to how communications events are to be handled, and other information that the customer can edit from time to time.

The service objects 102A–102E represent an action or task being performed on behalf of the customer. Each service object 102A–102E is designed either to be an interactive service to interact directly with the customer or an agent service to perform a task on his/her behalf autonomously. All services, whether interactive or an agent, are derived from a base service class. An interactive service is one that is driven by the customer directly through a user interface (e.g., an IVR service) and, therefore, requires that the customer be logged in, or connected, to the session object 100. An agent service can be a self-contained task that is driven by a set of pre-defined preferences/parameters and does not require direct interaction with the customer, although an agent may choose to interact with the customer if the customer happens to be connected. An agent can be initiated at any time, typically in response to an event, regardless of whether the customer is connected.

The profile object 104 supplies personal information/preferences to the session 100 and service 102 objects and is used to modify or customize their behavior. The information can be stored as an extensible list of named attributes, or fields. The value of a field may be visible to any customer or held private and visible only to this customer. For example, a customer's e-mail account may be public and, therefore, used by other customers to send a message, while the account password may remain private.

Figure 11:
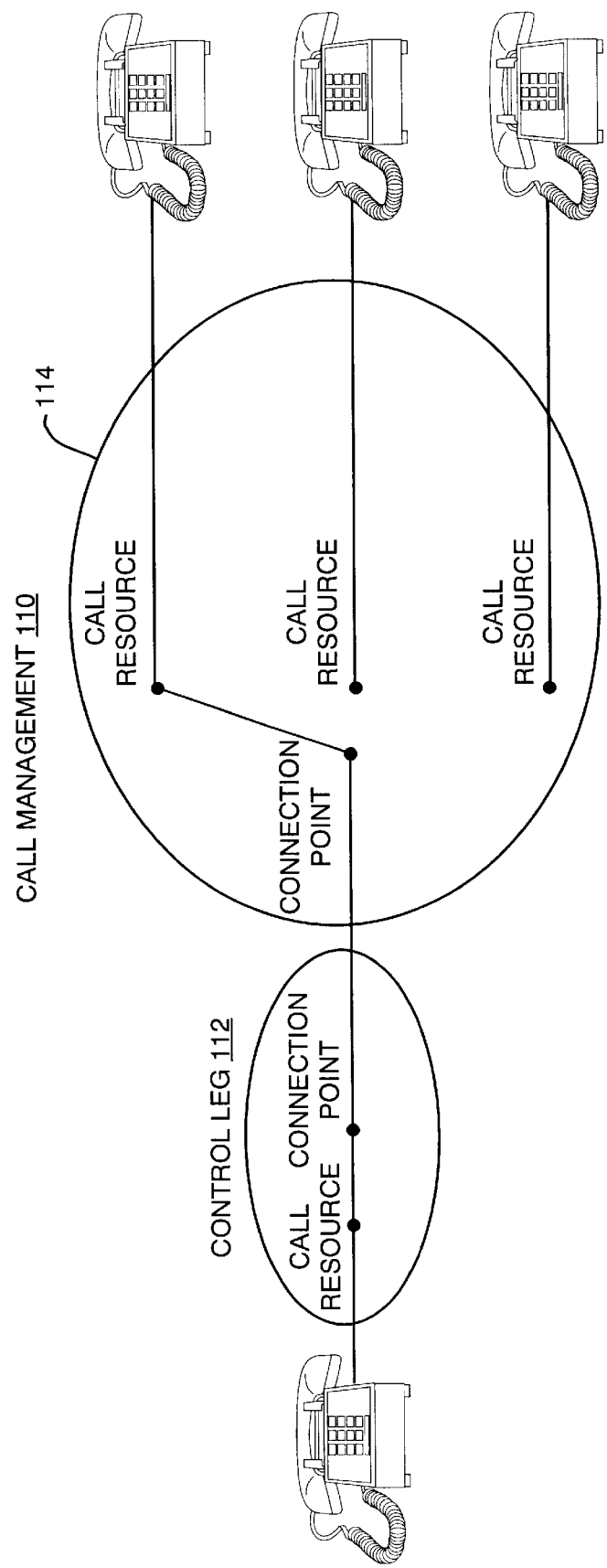
FIG. 11 depicts an infrastructure that represents a view of the state of a customer's communications.
Figure 14:
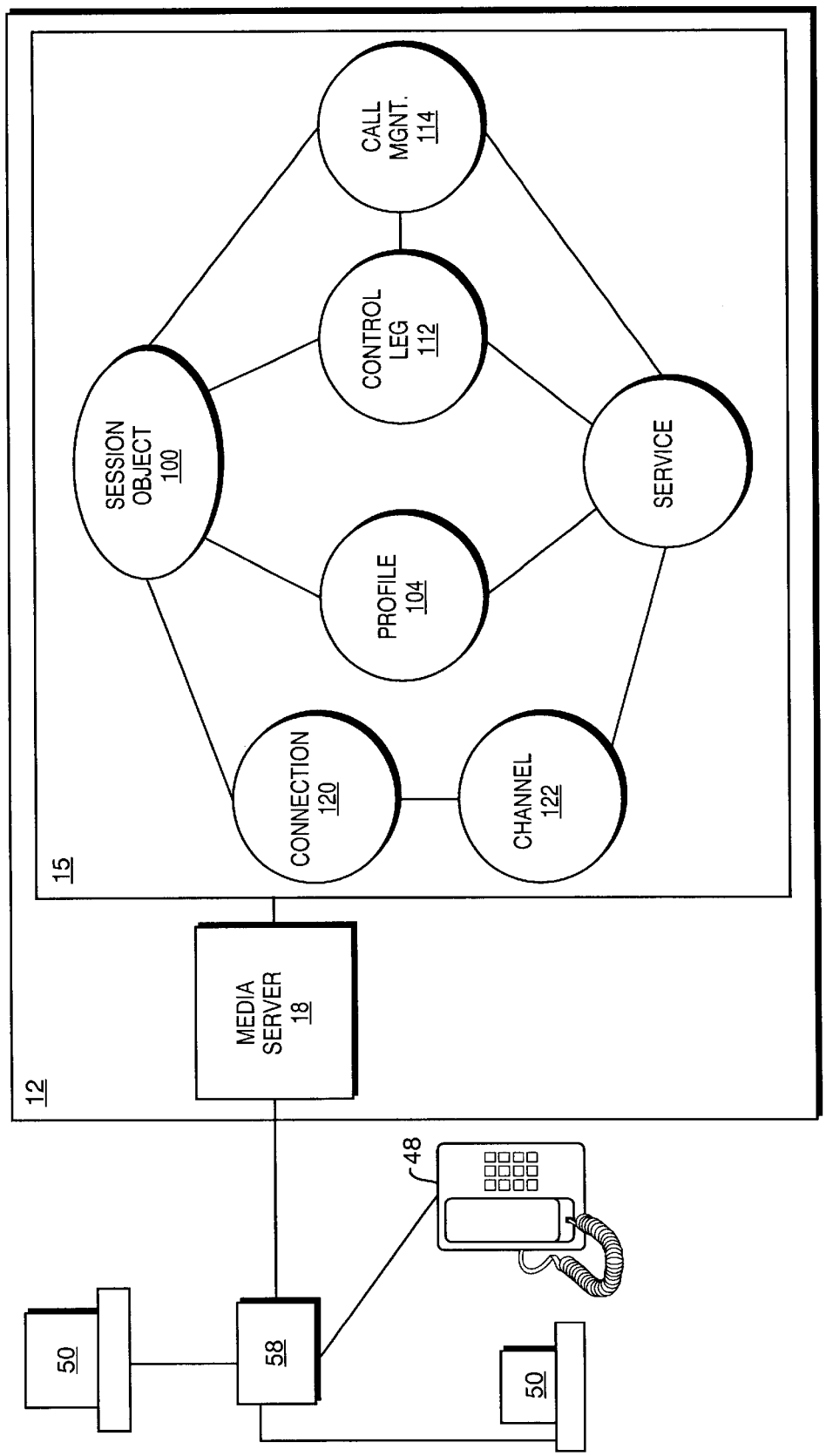
FIG. 14 depicts in greater detail the objects that can comprise an application in the context of a unified multimedia communications platform.

The ISP 15 can support unified communications in which services/agents present a single, integrated view of the state of a customer's communications. To this end, the application model can define a set of interconnected components, collectively referred to as the Communications Infrastructure, that represent this integrated view. Using the resources defined by the MSCI 40, the Communications Infrastructure manages the calls associated with a particular customer. Because these resources represent the customer's view of his/her calls, and not the "global" view of all the participants, as might be maintained by a media server, it can be understood as a half-call model. Because it represents information that is shared among a set of integrated services for a customer, the Communications Infrastructure is managed by the session object 100. In one embodiment, the Communications Infrastructure is made up of two primary objects as well as several agents that perform specific functions and help customize the way calls are managed on behalf of a customer. Such infrastructure is depicted in FIG. 11, which shows an infrastructure 110 formed of a control leg object 112 and a call management object 114. Additionally, FIG. 14 depicts one relationship between the session object 100 and the control object 112 and the call management object 114.

The control leg object 112 represents the multimedia pathway, or bearer channel, to the customer. For each media required, the control leg 112 allocates and manages an MSCI call resource to establish a media pathway to a device/destination specified by the customer. The set of call resources act as a "virtual" multimedia communications terminal, since the individual media streams to the customer do not have to terminate at the same physical device. For example, the customer can establish a multimedia call by using a phone for audio while using a PC for video. The customer can also redirect a particular media stream of the control leg 112 to a different device at any time without affecting an active call. For example, if the audio quality of an IP telephony client begins to degrade during a call, the customer can redirect the audio portion of the control leg 112 to a nearby phone.

The call management object 114 represents the set of incoming/outgoing calls to which a customer has access at any given time. Like the control leg 112, each call maintained by the call management object 114 consists of a set of call resources, each of which can correspond to a different media type. Each call object can be in one of the three states defined by the call management object 114: Setup, Active, or Message. A customer can have multiple calls in any of the three states.

A call in the Setup state can be an incoming call whose disposition (i.e., whether it will be accepted and in which of the other states it will be placed) has not yet been decided.

A call in the Active state can correspond to an individual with whom the customer wishes to actively communicate. Typically, the set of calls in the Active state are being controlled through an interactive service, such as a Java-based ISP call manager applet, the visual interface to the communications infrastructure that allows the customer to add/drop/select/conference the individuals with whom the customer wishes to interact. FIG. 11 depicts a set of Active calls in which one call has been selected by the customer (i.e., to which the control leg object 112 is connected), while the remaining calls are left on hold.

A call in the message state can be a call that has been sent to a network-based answering machine, similar to a voice mail system, to allow the caller to leave a multimedia message for the customer. Additionally, the customer can screen the call by connecting the control leg object 112 and/or pickup the call by moving the call to the Active state.

In addition to the control leg 112 and call management 114 objects, the Communications Infrastructure can include a set of agents. An incoming call agent can be created in response to an event generated when a call arrives for the customer. Based on preferences in the profile object 104, personal information (e.g., calendar/datebook) and other variables (e.g., Caller ID, time of day), the incoming call agent can decide whether the call should be placed under call management (as an Active call or a message call), transferred to another destination, or rejected/blocked. If a customer happens to be logged in, the agent can also query the customer directly to determine the disposition of the call.

A call recorder agent can be created in response to a call being placed in the message state under call management. After allocating the necessary recorder resources and connecting them to the media streams of the call, the call recorder agent can play a pre-recorded prompt, record the media streams until the call ends (or the agent is terminated), and then package the recorded media files into an e-mail message that is sent to the customer's mailbox for later retrieval/playback. As a result of its flexible design, this agent can also be used to record calls/conferences in the Active state. For example, using the ISP call manager, the customer drags an icon representing a call recorder agent onto an icon representing an active call/conference to begin recording the conversation.

Additionally, a media translation agent can be provided to support cross-media translation using the MSCI converter resources. Like the call recorder agent, this agent can be attached to a call and is designed to convert its media into a different form. For example, the media translation agent can be used to convert an incoming chat call into an audio call so that the customer can receive the call on a phone if so desired. In the future, the agent could be used to create a running transcript and/or "subtitles" for an audio/video call. More importantly, the media translation agent acts as a general model for enabling more advanced transformations, such as real-time language conversion (e.g., English-Spanish).

In a further embodiment, the systems described herein can provide interactive services that are processes that interact directly with a customer through the use of a defined user interface. Such interactive services employ a bi-directional channel over which the interaction between the customer and the service can take place. In one practice, the processes employ two types of channels within the ISP 15: a voice channel and a data channel. The voice channel can correspond to an audio pathway from a customer's phone (or possibly IP telephony client) to a voice resource used by the service to provide IVR-style interactions. Such a service can, inter alia, play a menu prompt, collect a DTMF/spoken response and perform the selected action. The data channel can correspond to an IP socket connection between a desktop client and a service. The desktop client and the service can interact by sending requests back and forth over the socket connection using an agreed upon data protocol.

Figure 13:
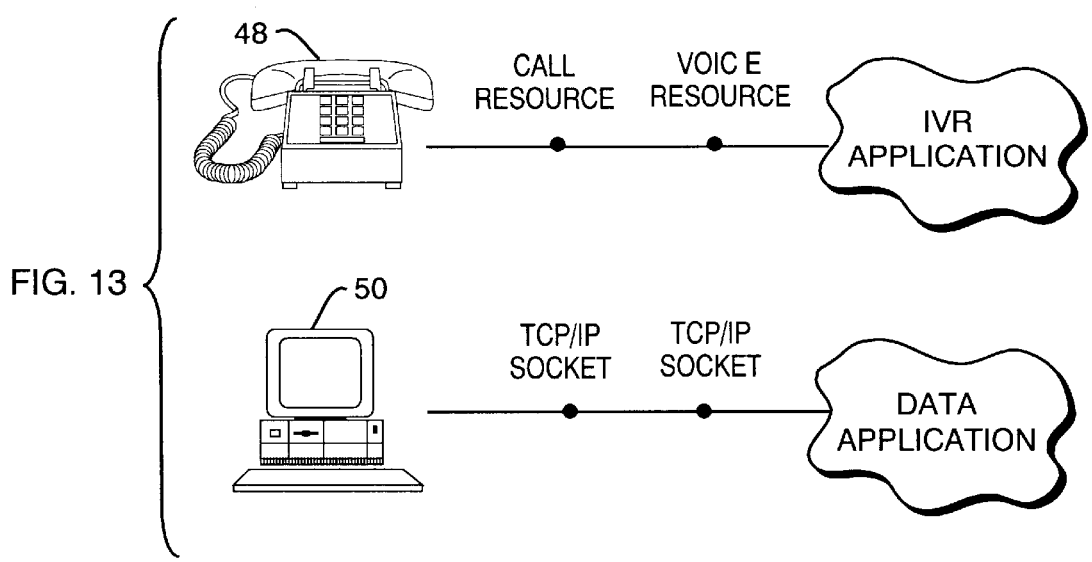
FIG. 13 depicts in more detail the channel connections between an application and a customer.

In general, a developer will build a service using one of these channels. As a result, each interactive service on the ISP can be classified as either a voice service or a Data service. A simple depiction of these two service types, and their corresponding channels, are shown in FIG. 13. The relationship between a connection object, channel object and session object is depicted in FIG. 14.

To execute an interactive service, a customer, can login to establish an authenticated "link" to his/her session object 100. Within the ISP application model, a connection object 120 can represent the fact that the customer has logged in. When a customer logs in, a connection is created and associated with his/her session object 100. Just as there is one active session per customer, there can be one active connection per session object 100. The way in which a customer logs in can determine the type of channels that are available and, thus, the type of interactive services that he/she can execute. Therefore, each connection type can be responsible for managing/establishing the channel(s) between the customer and his/her interactive services. For example, the ISP can define two connection types corresponding directly to the channel types: a voice connection to support voice services and a data connection to support data services. Optionally, a connection type could be defined to support simultaneous voice and data services.

The voice connection can be responsible for providing a voice channel to each voice service as it is created. Each voice channel can employ a pair of audio resources, a call resource connected to a voice resource, to enable a voice service to perform IVR operations. The voice connection can be responsible for allocating and managing these resources, which are shared by the voice channels. The voice channel can employ a locking mechanism defined in the voice connection to ensure that only one voice service is actively using these resources at any given time.

The data connection is responsible for providing a data channel to each data service as it is created. Each data channel represents a socket connection over which the data service can read/write protocol messages from/to a desktop client. Since each socket connection is associated with a single service, the data connection does not have to provide a mechanism for sharing socket connections. Therefore, the data connection can support multiple active data services simultaneously. For example, a customer can use a web browser to run the HTML-based directory service while using the ISP call manager (and its corresponding service) to manage his/her calls.

An interactive service can use either a voice channel or data channel and, therefore, may be dependent on the connection type. However, in optional embodiments, the services can be independent of the connection type. Consider the case of an incoming call agent that decides, optionally, to interact with a customer who happens to be logged in to determine whether or not he/she wishes to accept an incoming call. Rather than force the developer to write additional code that is conditional on the connection type, or develop both a voice and data version of the same service, it is better to delegate the decision on how to query the customer to the connection. In this way, the service developer can create a single service that is interactive, but independent of the current connection type.

To support this, the connection object can define a set of general dialog methods to send query, notification and update messages to the customer. To receive such messages, the customer initiates an interactive service that registers itself as a "message handler" for the connection. Whenever one of the dialog methods is called, the connection passes the message to the registered service, which then decides how to present it to the customer. For example, when the ISP call manager is started, its corresponding service registers itself as a message handler with the data connection in order to receive queries, notifications and call state updates from the objects/agents of the communications Infrastructure. The service can encode each message using a predefined data protocol and send it over its data channel to the ISP call manager, where the encoded message can be presented to the customer using its graphical user interface.

In further alternative embodiments, the systems described herein can employ agents. An agent is generally understood as a service that can perform its task based on pre-defined preferences/parameters without interacting with the customer. An agent service is typically created in response to an event, or external trigger, and is designed to process that event in a personalized way on behalf of a customer. Optionally, a number of mechanisms can trigger an agent. For example, when someone calls an ISP customer, an event can be generated that triggers the creation of an incoming call agent to decide the disposition of the call. In addition to agents associated with the Communications Infrastructure, agents can also be employed to support and work with messaging. For example, there can be an agent, the Incoming message agent, for processing incoming messages. The incoming message agent examines e-mail messages before they are placed in the customer's ISP mailbox and optionally modifies a message based on the customer's preferences. The agent can remove/replace message body parts and/or insert new body parts. For example, the Incoming message agent might replace large media file attachments with HTML-based streaming controls and/or insert targeted advertisements. The incoming message agent can also be used to filter/block unwanted messages. The incoming message agent, in one alternative embodiment, is meant to "preprocess" an e-mail message based on the customer's preferences before placing it into his/her customer's mailbox. To this end, the agent is to act as a filter between the local message transfer process, such as sendmail, and the local mailbox access process, applying transformations to and emitting a message stream with MIME compliant bodies. The incoming message agent can be implemented as a filter program, called the message preprocessor, that plays the role of the incoming message agent.

When a message is placed in an ISP mailbox, an event can be generated that initiates the message alert agent. This agent can determine whether or not the customer should be informed of the new message and decides how the customer should be notified (e.g., paging the customer, popping up a dialog box, etc.). In addition, the message alert agent may redirect messages from the ISP mailbox to an external mailbox specified by the customer. In one practice, a message generated by any other ISP service is always sent first to the ISP mailbox to allow the incoming message agent to process it and to enable the message alert agent to send a notification and/or redirect it to the mailbox preferred by the customer.

In one alternative embodiment, the systems described herein extend the role of e-mail from message delivery to service activation. The Service Activation Message (SAM) infrastructure, an extension of the ISP message server, allows a remote customer to initiate an agent service by sending an e-mail message to the ISP. For example, suppose that a customer needs to call a large group of people to deliver the same message (e.g., "soccer practice has been canceled"). By sending e-mail to broadcast@gte.com, the ISP will initiate a Broadcast agent on behalf of the customer to deliver the message to the specified recipients and report back when finished. This is just one example of many possible SAM agents, and other such SAM agents can be developed by those of ordinary skill in the art, and such agents will be understood to fall within the scope of the invention.

Each ISP application, such as those described above, can be constructed using a framework of objects defined as described with reference to FIG. 12. A basic ISP application can consist of a Session and a Profile and typically has at least one active service. A service can use the control leg object and 112 and call management object 114 to control the customer's communications. When a customer is actively connected to the ISP, a connection object can be created and an appropriate channel provided to allow a service to interact with the customer. In FIG. 14, there is depicted basic object interconnections of one ISP application framework, suitable for practice with the systems described herein. Although not depicted here, each service also has access to the APIs provided by the media servers 34, message servers 30 and Information servers 32.

Figure 15:
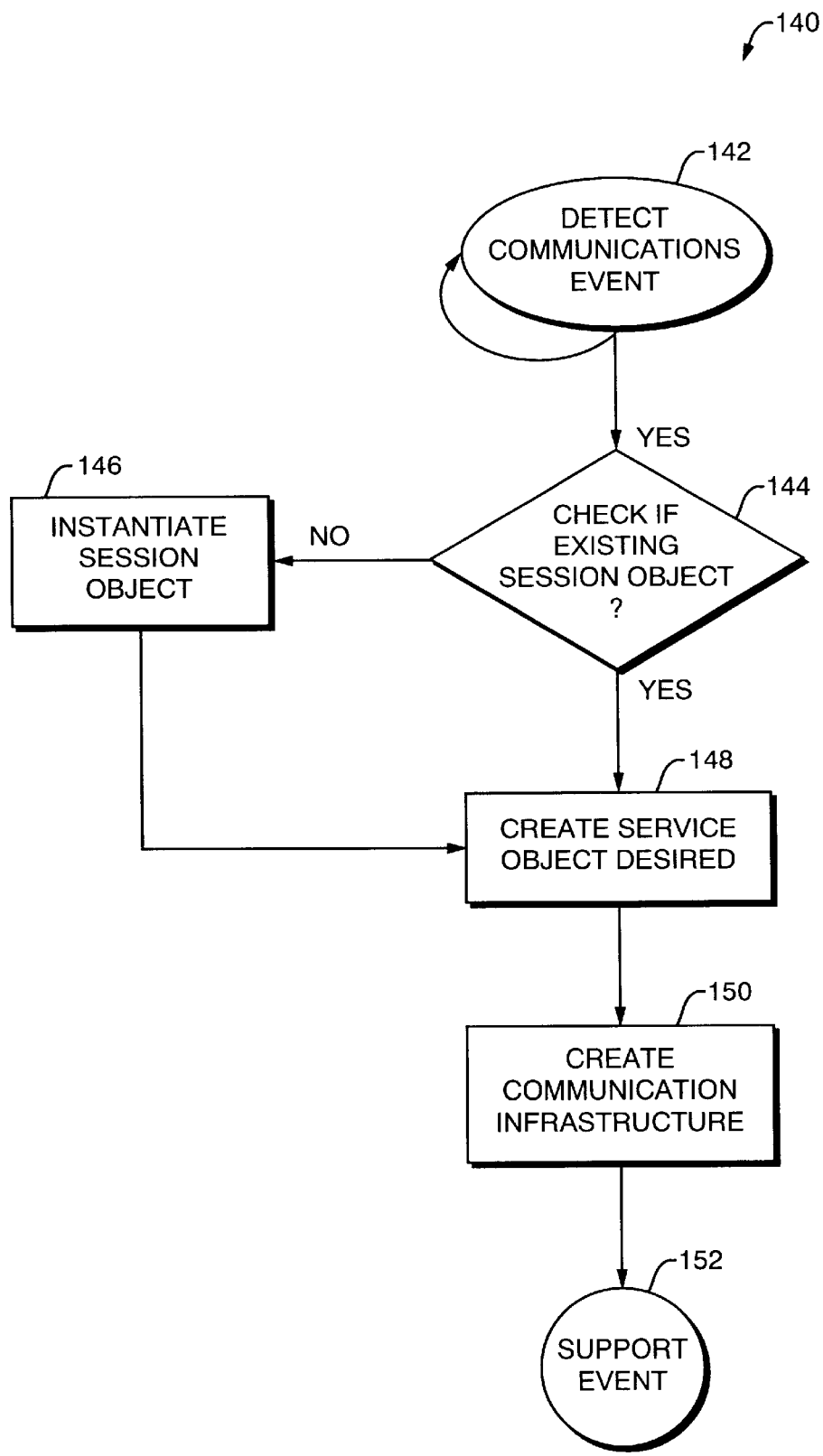
FIG. 15 depicts one process according to the invention for configuring a server, such as the server depicted in FIG. 14.

More specifically, FIG. 14 depicts an ISP application that is being employed for allowing a customer to handle a communications event according to the preferences of that customer. As discussed above, the system 12 includes an ISP application 15 that interfaces with one or more media servers, such as the depicted collection of media servers 18. The media servers 18, at the direction of the ISP 15, arrange the communication devices available to the customer into a pathway that will support the communications event at hand. As also discussed above, a session object 100 can be created for each customer serviced by the ISP 15. FIG. 15 depicts one process 140 for creating a session object 100 for a customer and for configuring an ISP, such as the ISP 15 depicted in FIG. 14. Specifically, the process 140 depicts a first step 142 wherein an ISP waits for the detection of an incoming communications event. As described above, an event manager can be configured to detect an incoming event, such as an incoming real time communications event like an IP multimedia call. The communications manager can generate an event signal that directs the ISP 15 to determine whether there is a session object in existence for the customer associated with the event. Continuing with the above example, the process 140, upon detection of an event, would proceed to step 144 to determine whether there is an existing session object for the customer associated with the IP multimedia call. As shown in FIG. 15, if a session object is presently instantiated for that customer, the process 140 can proceed to step 148. Alternatively, if no session object is presently created, the process 140 proceeds to step 146 wherein a session object for the customer being called is instantiated. A profile object, including the preferences of that customer, can also be instantiated at this time. Upon establishing the presence of a session object for the customer associated with the communications event, the process 140 proceeds to step 148 wherein the information contained within or managed by the instantiated session object, which can include information as to how a customer wishes to handle a communications event, is processed to determine the type of service that should be activated. In the present example, the state information associated with the instantiated session object can be processed to determine which service the customer wishes to employ to handle incoming IP multimedia calls. In response to this state information, the process 140 in step 148 can instantiate the service object desired by the customer. To support the instantiated service object, the process 140 can proceed to step 150 wherein the communication infrastructure, including the control leg object 112 and the call management object 114 are instantiated. As described above, the control leg object 112 allocates and manages call resources, such as those provided through the MSCI, to establish a multimedia pathway to the devices specified by the customer. The created pathway can then be employed to support the communications event, until such time that the customer wishes to reset the control leg, or the call terminators.

FIG. 14 depicts the set of devices that the customer, for this example, wishes to employ for supporting an incoming multimedia IP phone call. Specifically, FIG. 14 depicts that the customer wishes to receive the video stream of the event on the terminal 50 and the audio stream of the event on the handset 48. To this end, the process 140, in step 150, can provide a communication infrastructure, including the depicted control leg object 112 and call management object 114 to create a multimedia pathway that will support the incoming call as desired by the customer. For example, as depicted in FIG. 14, the control leg object 112 can employ the resource objects provided by the media servers 18 and described above, to create a logical coupling between the incoming multimedia IP phone call and the end points desired by the customer. Again as described above, the media servers 18 can perform the physical mapping between the logical resources of the media servers and the communication devices that will support the communications event. For example, as depicted in FIG. 14, the media servers 18 can provide a physical mapping that employs an PSTN/IP gateway 58, as well as other devices, to direct a video stream to the customer's workstation 50 and an audio stream to the customer's handset 48. Once configured, the pathway can support the communications event, until the customer wishes to change the pathway, or to terminate the communication event.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A method for allowing a customer to control their participation in a communications event, comprising:

identifying a communications event associated with the customer, the communications event being established between at least one party and one or more hardware devices used by the customer, providing for that customer a session object capable of maintaining state information representative of status of the communications event associated with that customer, providing a plurality of service objects each capable of providing a communications service for supporting the communications event, each of the service objects being responsive to the state information maintained within the session object, said session object operating as a control point for said service objects allowing the customer to selectively configure support for the communications event, and allowing the customer to adjust the state information during the communications event to dynamically switch the one or more hardware devices being used by the customer during the communications event without affecting the communications event.

2. A method according to claim 1, further comprising
providing a customer profile object having information representative of characteristics associated with a respective customer, including information representative of customer preferences capable of modifying behavior of said service objects.

3. A method according to claim 1, further comprising
allowing said session object to store control information representative of information provided by the customer for controlling the behavior of a service object.

4. A method according to claim 1, wherein said state information includes information for modifying behavior of two or more service objects to provide coordinated operation of said service objects.

5. A method according to claim 1, further including
providing a communications infrastructure for mapping communications events associated with said customer to a communications structure capable of supporting the communications event.

6. A method according to claim 5, wherein providing said communications structure comprises providing an endpoint device capable of processing communication information associated with said communications event.

7. A method according to claim 6, wherein providing said endpoint device comprises providing a hardware device.

8. A method according to claim 6, wherein providing said endpoint device comprises providing a device selected from a group including telephone handsets, wireless phones, personal digital assistants, set top boxes, personal computers, pagers, facsimile machines, Internet appliances, and Java telephones.

9. A method according to claim 6, wherein providing said endpoint device comprises providing a software device.

10. A method according to claim 6, wherein providing said endpoint device comprises providing a device selected from a group including IP telephony clients, desktop conferencing clients, email clients, browser programs, and personal information management clients including calendaring programs, address book programs and directories.

11. A method according to claim 5, further including
providing a media server having a plurality of resource objects, each of the resource objects being capable of allowing the service object to control a communication device capable of supporting the communications event.

12. A method according to claim 5, wherein the providing a communications infrastructure includes
providing a control leg object for mapping the communications event to a set of resource objects that control a communication device that can provide a media pathway for coupling the customer to the communications event.

13. A method according to claim 12, wherein the providing a control leg object for mapping a real time communications event to a set of resource objects, includes
accessing the set of resource objects for controlling a communications device that provides a multimedia pathway for coupling the customer to the communications event.

14. A method according to claim 12, wherein the providing a control leg object includes
processing said state information to identify the set of resource objects that map the communications event to a communication device selected by the customer.

15. A method according to claim 12, wherein the communications event is a call, the allowing the customer to adjust the state information includes
allowing the customer to adjust the state information to dynamically alter hardware devices employed by the resource objects for supporting the call, thereby providing endpoint independent call handling.

16. A method according to claim 5, wherein the providing a communications infrastructure includes
providing a call management object for mapping the communications event to a set of resource objects capable of offering the communications event as a member of a set of such events available to the customer.

17. A method according to claim 5, wherein the communications event includes an incoming call, the method further including
providing an incoming call agent capable of processing the state information for determining whether to place the incoming call under call management.

18. A method according to claim 5, wherein the communications event includes an incoming call, the method further including
providing an incoming call agent capable of processing the state information to determine whether to place the incoming call in an active state representative of connecting the incoming call to an endpoint.

19. A method according to claim 5, wherein the communications event includes an incoming call, the method further including
providing an incoming call agent capable of processing the state information to determine whether to place the incoming call in a messaging state representative of connecting the incoming call to a messaging client capable of generating a message representative of the incoming call.

20. A method according to claim 5, wherein the communications event includes an incoming call, the method further including
providing an incoming call agent capable of processing the state information for determining an action for processing the incoming call, wherein the action includes at least one of transferring the incoming call to a predetermined location, sending the incoming call to another customer, blocking the incoming call, and querying the customer for information for further processing of the incoming call.

21. A method according to claim 5, wherein the communications event includes a call, the providing a communications infrastructure includes
providing a call recorder agent capable of capturing a media stream associated with the call and of packaging the resulting media file into an e-mail message for delivery to a mailbox associated with the customer.

22. A method according to claim 5, wherein the communications event includes a call, the providing a communications infrastructure includes
providing media translation agent capable of supporting real-time cross-media translation to translate a media stream associated with the call from a first format to a second format.

23. A method according to claim 1, further including
allowing the customer to login and thereby create a connection object capable of allowing the customer to interact with said session object.

24. A method according to claim 23, further including
creating a connection object that provides a channel abject capable of acting as a media pathway between an endpoint employed by the customer and the service object.

25. A method according to claim 1, including
creating the session object responsive to the identification of the communications event.

26. A method according to claim 25, wherein creating a session object occurs in response to detecting initiation of the communications event associated with the customer.

27. A method according to claim 25, wherein creating a session object occurs in response to detecting an incoming message for the customer.

28. A system for allowing a customer to control their participation in a communications session, comprising:
state management means, associated with the customer, and being capable of maintaining state information representative of a communications session associated with the customer and at least one other party,
service means for supporting the communications session, and being responsive to the state information maintained by the state management means, and
means for allowing the customer to adjust the state information during the communications session to dynamically switch to one or more different hardware devices during the communications session without interrupting the communications session.

29. A system according to claim 28, further comprising media server means for providing a plurality of resource objects capable of controlling a set of communication devices associated with the customer.

30. A system according to claim 29, further comprising control leg means for mapping the communications session to a set of the resource objects to provide a media pathway for coupling the customer to the communications session.

31. A system according to claim 28, wherein said means for allowing a customer to adjust state information comprises
a graphical user interface for presenting the customer with graphical icons that can be manipulated to selectively adjust the support for the communications session.

32. A system for allowing a customer to control their participation in a communication with at least one other party, comprising:
a service platform capable of detecting a communication between the customer and the at least one other party and capable of generating a session object for the customer in response to the communication,
the session object, associated with the customer, and capable of managing state information representative of status of one or more real-time events associated with the customer and occurring during the communication, and capable of generating a service object for supporting the one or more real-time events associated with the customer, and
the service object, responsive to the state information maintained by the session object, and capable of providing a communications service corresponding to the one or more real-time events associated with the customer, and
wherein the session object is further configured to permit the customer to adjust the state information during the one or more real-time events to dynamically change one or more hardware devices to one or more different hardware devices used to support the one or more real-time events without interrupting the one or more real-time events.

33. A system according to claim 32, further comprising
a profile object, having information representative of characteristics associated with a respective customer, including information representative of customer preferences capable of modifying behavior of the service object.

34. A computer readable medium containing instructions for causing at least one processor to perform a method for permitting a customer to control a real time communications session, the method comprising:
detecting at least one real time communications session between the customer and at least one other party;
generating a session object for the customer in response to the communications session;
maintaining state information representative of a status of the communications session;
generating a plurality of service objects that provide a communications service relating to the communications session; and
permitting the customer to adjust the state information during the communications session to dynamically switch to one or more different hardware devices during the communications session without effecting the communications session.

* * * * *